July 3, 1923.

O. J. BOUTTE

NUT LOCK

Filed April 12, 1922

1,460,884

Inventor

O. J. Boutte.

By Lacey & Lacey, Attorneys

Patented July 3, 1923.

1,460,884

UNITED STATES PATENT OFFICE.

OCTAVE JOHN BOUTTE, OF BEAUMONT, TEXAS, ASSIGNOR OF ONE-HALF TO JOHN D. McCALL, OF BEAUMONT, TEXAS.

NUT LOCK.

Application filed April 12, 1922. Serial No. 551,948.

*To all whom it may concern:*

Be it known that I, OCTAVE JOHN BOUTTE, a citizen of the United States, residing at Beaumont, in the county of Jefferson and State of Texas, have invented certain new and useful Improvements in Nut Locks, of which the following is a specification.

My invention relates to locks for nuts and bolts and more particularly to a device for locking flat sided nuts and bolt heads, whether of square, hexagonal, or any other polygonal shape.

One object of the invention is to construct the lock in such a manner that it may be used on any commercial flat-sided bolt head or nut without any alterations such as drilling holes or cutting slots in the bolts or nuts.

In the accompanying drawing one embodiment of the invention is illustrated; and

Figure 1:
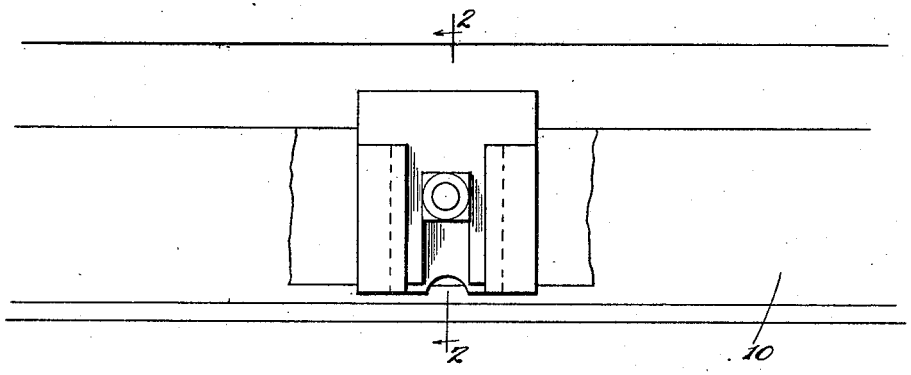
Figure 1 shows a side view of a rail joint with the nut lock applied.
Figure 2:
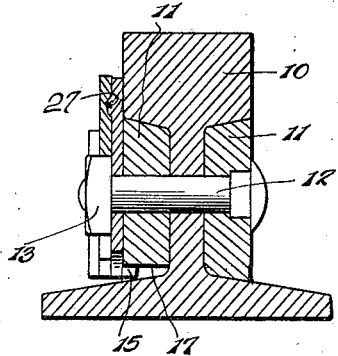
Figure 2 is a transverse section along line 2—2 of Figure 1.
Figure 3:
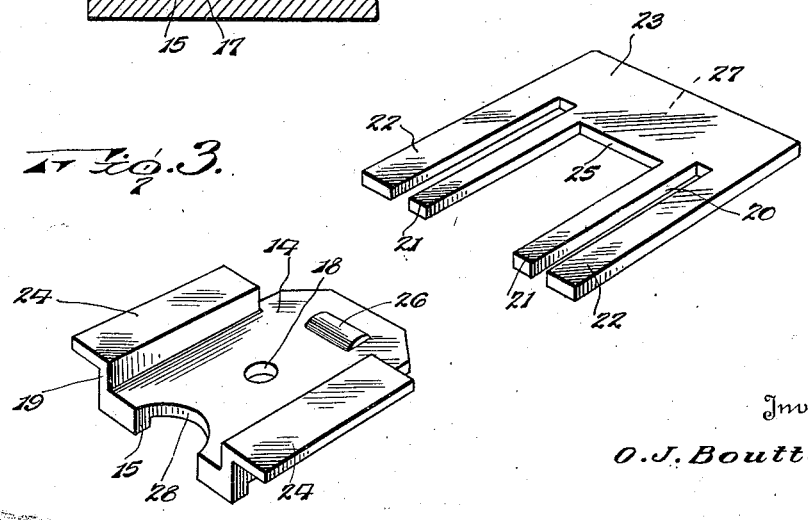
Figure 3 is a perspective view of the details constituting the nut lock.

Reference numeral 10 represents a rail and 11 fish plates held together by means of a bolt 12 and a nut 13. Between the nut and the adjacent fish plate 11 is inserted a base 14, which is preferably provided with lips 15 bent to the rear of the base so as to be able to engage the bottom edge 17 of the corresponding fish plate or a notch therein thereby preventing the turning of the base when the nut 13 is tightened on the bolt 12, the base having a circular aperture 18 through which the bolt 12 penetrates. Along each side of the base 14 is provided an L-shaped flange 19, the perpendicular portion of which is intended to engage in the slot 20 formed between the fingers 21 and 22 in the slide 23. The transverse ledges 24 of the flanges extend outwardly over the outer fingers 22 of the slide 23 in order to hold the slide tightly down on the base. Between the inner fingers 21 is provided a recess 25, which has the approximate width of the nut 13, for which it is intended and it will be evident, when the slide 23 is assembled on the base 14 after the nut 13 has been drawn up tightly, that the engagement between the fingers 21 and the flat sides of the nut 13 permits of no loosening of the nut.

In order to rigidly secure the slide 23 on the base 14 a slight projection 26 is provided on the base and a corresponding notch 27 on the under side of the slide 23, which are situated with relation to each other, so that they will engage, when the slide 23 is pushed in position on the base 14.

It will be evident that the locking device is applicable to any kind of bolt heads and nuts and not only to rail joints, and it may for instance be used for safety hand bolts on box cars and in the latter case, I preferably provide a depression 28 in the lower edge of the base 14. The device may also be used with advantage on automobiles, and in fact on any kind of machinery where one or more bolts and nuts need to be locked. The hand bolt would rest in the depression 28.

When the device is used for locking more than one bolt, the lips 15 become unnecessary and are dispensed with, as each bolt will prevent the base 14 from turning around another bolt.

Instead of letting the lips 15 engage with the edge of a fish plate, it may under certain conditions be more advantageous to provide grooves or countersinks for them.

Having thus described the invention what is claimed as new is:

1. A nut lock comprising a base having an aperture for a bolt, parallel flanges on the base and a slide having finger elements engaging with said flanges on both sides thereof, a recess being formed between said elements corresponding to the width of the nut to be locked.

2. A nut lock comprising a base having an aperture for a bolt, parallel flanges on the base and a slide having slotted finger elements engaging with their slotted portions, both sides of said flanges, said finger elements being spaced apart corresponding to the width of the nut to be locked, and means for securing the base and the slide in locking position.

3. A nut lock comprising a base having an aperture for a bolt, parallel L-shaped flanges rising from the base and a slide having slotted finger elements engaging with their slotted portions, both sides of said flanges, said finger elements being situated in the same plane and spaced apart corresponding to the width of the nut to be locked, said flanges terminating with outwardly directed ledges overlying said finger elements and means for securing the base on the slide in locking position.

4. The combination with a rail joint having fish plates and securing bolts with nuts; of a locking device for the nuts comprising a base seated between the nut and the fish plate around the bolt and having lips adapted to engage the edge of the fish plate, parallel L-shaped flanges along the sides of the base, a fingered slide adapted to engage said flanges and provided with a recess having the same width as the nut to be locked, and a projection on one and a corresponding notch on the other of said base and slide for rigidly securing them together.

In testimony whereof I affix my signature.

OCTAVE JOHN BOUTTE.